United States Patent
Bodtker et al.

(10) Patent No.: US 10,093,339 B2
(45) Date of Patent: Oct. 9, 2018

(54) STEERING COLUMN ASSEMBLY HAVING A LOCKING ASSEMBLY

(71) Applicant: Steering Solutions IP Holding Corporation, Saginaw, MI (US)

(72) Inventors: Joen C. Bodtker, Gaines, MI (US); Randy W. Jones, North Branch, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/334,631

(22) Filed: Oct. 26, 2016

(65) Prior Publication Data

US 2018/0111639 A1    Apr. 26, 2018

(51) Int. Cl.
  *B62D 1/184* (2006.01)
  *B62D 1/185* (2006.01)
  *B62D 1/187* (2006.01)

(52) U.S. Cl.
  CPC ............. *B62D 1/184* (2013.01); *B62D 1/185* (2013.01); *B62D 1/187* (2013.01)

(58) Field of Classification Search
  CPC combination set(s) only.
  See application file for complete search history.

(56) References Cited

U.S. PATENT DOCUMENTS

| | | | | | |
|---|---|---|---|---|---|
| 3,991,859 | A | * | 11/1976 | Coulter | F16D 65/18 188/106 F |
| 4,267,742 | A | * | 5/1981 | Cabeza | B62M 25/045 74/471 R |
| 5,088,767 | A | * | 2/1992 | Hoblingre | F16B 2/16 280/775 |
| 5,213,004 | A | * | 5/1993 | Hoblingre | B62D 1/184 403/92 |
| 5,394,767 | A | * | 3/1995 | Hoblingre | B62D 1/184 188/72.7 |
| 5,921,577 | A | * | 7/1999 | Weiss | B62D 1/184 280/775 |
| 6,419,269 | B1 | * | 7/2002 | Manwaring | B62D 1/184 280/775 |
| 6,467,367 | B2 | * | 10/2002 | Kim | B62D 1/184 280/775 |
| 7,010,996 | B2 | * | 3/2006 | Schick | B62D 1/184 280/775 |
| 7,052,043 | B2 | * | 5/2006 | Lee | B62D 1/184 280/775 |
| 7,083,198 | B2 | * | 8/2006 | Lee | B62D 1/184 280/775 |

(Continued)

*Primary Examiner* — Nicole T Verley
(74) *Attorney, Agent, or Firm* — Cantor Colburn LLP

(57) ABSTRACT

A steering column assembly includes a locking assembly. The locking assembly is operatively connected to a jacket assembly. The locking assembly includes a housing, a first member, a second member, and a third member. The housing has a base and a wall that extends from the base. The wall and the base define a cavity. The first member is disposed within the cavity. The first member defines a first member ramp. The second member is disposed within the cavity and is spaced apart from the first member. The second member defines a second member ramp. The third member has a body that is disposed between the first member and the second member and an actuation arm that extends from the body.

19 Claims, 5 Drawing Sheets

(56) References Cited

U.S. PATENT DOCUMENTS

| | | | | |
|---|---|---|---|---|
| 7,350,814 B2* | 4/2008 | Hong | B62D 1/184 | 280/775 |
| 7,415,908 B2* | 8/2008 | Zernickel | B62D 1/184 | 280/775 |
| 7,587,959 B2* | 9/2009 | Ridgway | B62D 1/184 | 280/775 |
| 7,735,868 B2* | 6/2010 | Ridgway | B62D 1/184 | 280/775 |
| 7,798,037 B2* | 9/2010 | Tinnin | B62D 1/184 | 280/775 |
| 7,878,543 B2* | 2/2011 | Bodtker | B62D 1/184 | 280/775 |
| 8,438,944 B2* | 5/2013 | Ridgway | B62D 1/195 | 280/775 |
| 8,590,932 B2* | 11/2013 | Dietz | B62D 1/184 | 280/775 |
| 8,641,095 B2* | 2/2014 | Uesaka | B62D 1/184 | 280/775 |
| 8,826,767 B2* | 9/2014 | Maniwa | B62D 1/184 | 280/775 |
| 8,881,618 B2* | 11/2014 | Buzzard | B62D 1/184 | 280/775 |
| 9,283,982 B2* | 3/2016 | Hong | B62D 1/184 | |
| 9,393,986 B1* | 7/2016 | Anspaugh | B62D 1/184 | |
| 9,415,793 B2* | 8/2016 | Kubota | B62D 1/184 | |
| 9,522,693 B2* | 12/2016 | Tomaru | B62D 1/184 | |
| 9,545,943 B2* | 1/2017 | Sakuda | B62D 1/185 | |
| 2005/0178231 A1* | 8/2005 | Schick | B62D 1/184 | 74/493 |
| 2006/0169088 A1* | 8/2006 | Jones | B62D 1/184 | 74/493 |
| 2006/0196302 A1* | 9/2006 | Hochmuth | B62D 1/184 | 74/492 |
| 2006/0273567 A1* | 12/2006 | Fix | B62D 1/184 | 280/775 |
| 2007/0234845 A1* | 10/2007 | Gist, Jr. | B62D 1/184 | 74/569 |
| 2008/0023952 A1* | 1/2008 | Manwaring | B62D 1/195 | 280/777 |
| 2009/0019963 A1* | 1/2009 | Hubrecht | B62D 1/184 | 74/493 |
| 2009/0095114 A1* | 4/2009 | Ridgway | B62D 1/181 | 74/493 |
| 2009/0114055 A1* | 5/2009 | Stroud | B62D 1/184 | 74/493 |
| 2016/0280248 A1* | 9/2016 | Uesaka | B62D 1/195 | |
| 2017/0057535 A1* | 3/2017 | Vermeersch | B62D 1/184 | |
| 2017/0361862 A1* | 12/2017 | Charvet | B62D 1/184 | |

* cited by examiner

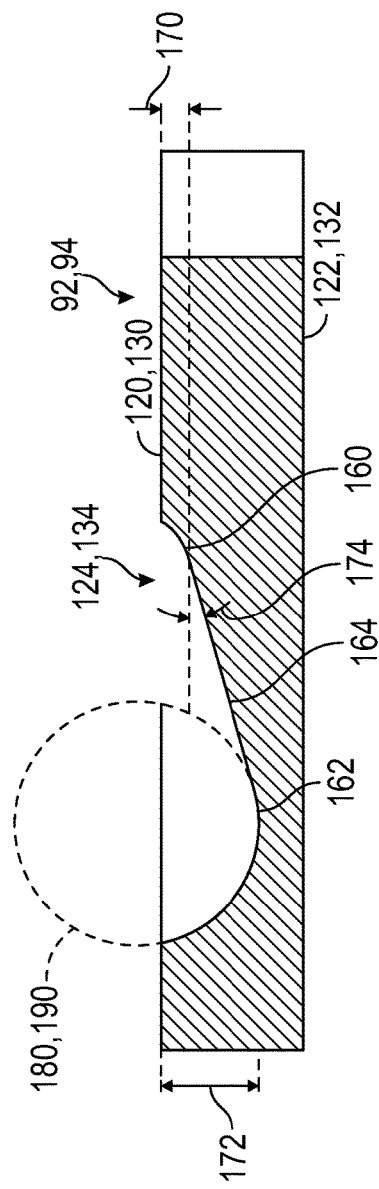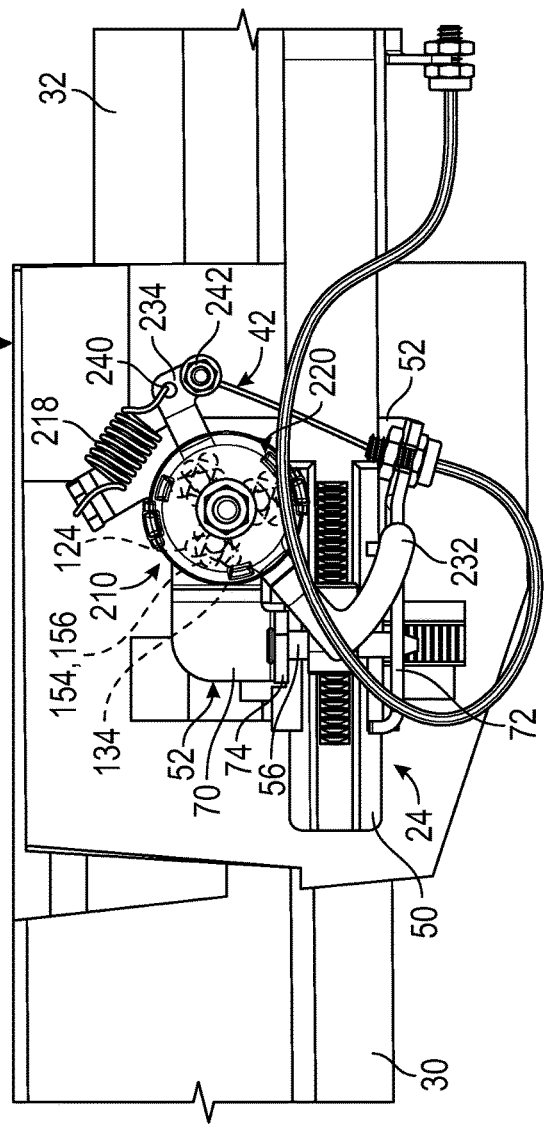

STEERING COLUMN ASSEMBLY HAVING A LOCKING ASSEMBLY

BACKGROUND OF THE INVENTION

Some vehicles are provided with a steering column assembly that is telescopically adjustable. The steering column assembly is provided with a feature or a mechanism that maintains the steering column assembly in a fixed position for driving. The feature or mechanism restricts each degree of freedom of the steering column assembly.

SUMMARY OF THE INVENTION

According to an embodiment of the present disclosure, a steering column assembly is provided. The steering column assembly includes a jacket assembly and a locking assembly. The jacket assembly is adjustable along a steering column axis. The locking assembly is pivotally connected to the jacket assembly. The locking assembly includes a first member, a second member, and a third member. The first member has a first member first surface, a first member second surface that is disposed opposite the first member first surface, and a first member ramp that extends from the first member first surface towards the first member second surface. The second member is spaced apart from the first member. The second member has a second member first surface that faces towards the first member first surface, a second member second surface that is disposed opposite the second member first surface, and a second member ramp that extends from the second member first surface towards the second member second surface. The third member has a body that is disposed between the first member and the second member. The third member is movable relative to at least one of the first member and the second member.

According to another embodiment of the present disclosure, a steering column assembly is provided. The steering column assembly includes a locking assembly and a rake bolt. The locking assembly is operatively connected to a jacket assembly. The locking assembly includes a housing, a first member, a second member, and a third member. The housing has a base and a wall that extends from the base. The wall and the base define a cavity. The first member is disposed within the cavity. The first member defines a first member ramp. The second member is disposed within the cavity and is spaced apart from the first member. The second member defines a second member ramp. The third member has a body that is disposed between the first member and the second member and an actuation arm that extends from the body. The rake bolt extends at least partially through the jacket assembly, the housing, the first member, the second member, and the third member.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 4 is a partial sectional view of a ramp of a first member ramp or a second member ramp of the locking assembly;

FIG. 5 is a partial perspective view of the steering column assembly having a second embodiment of the locking assembly;

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
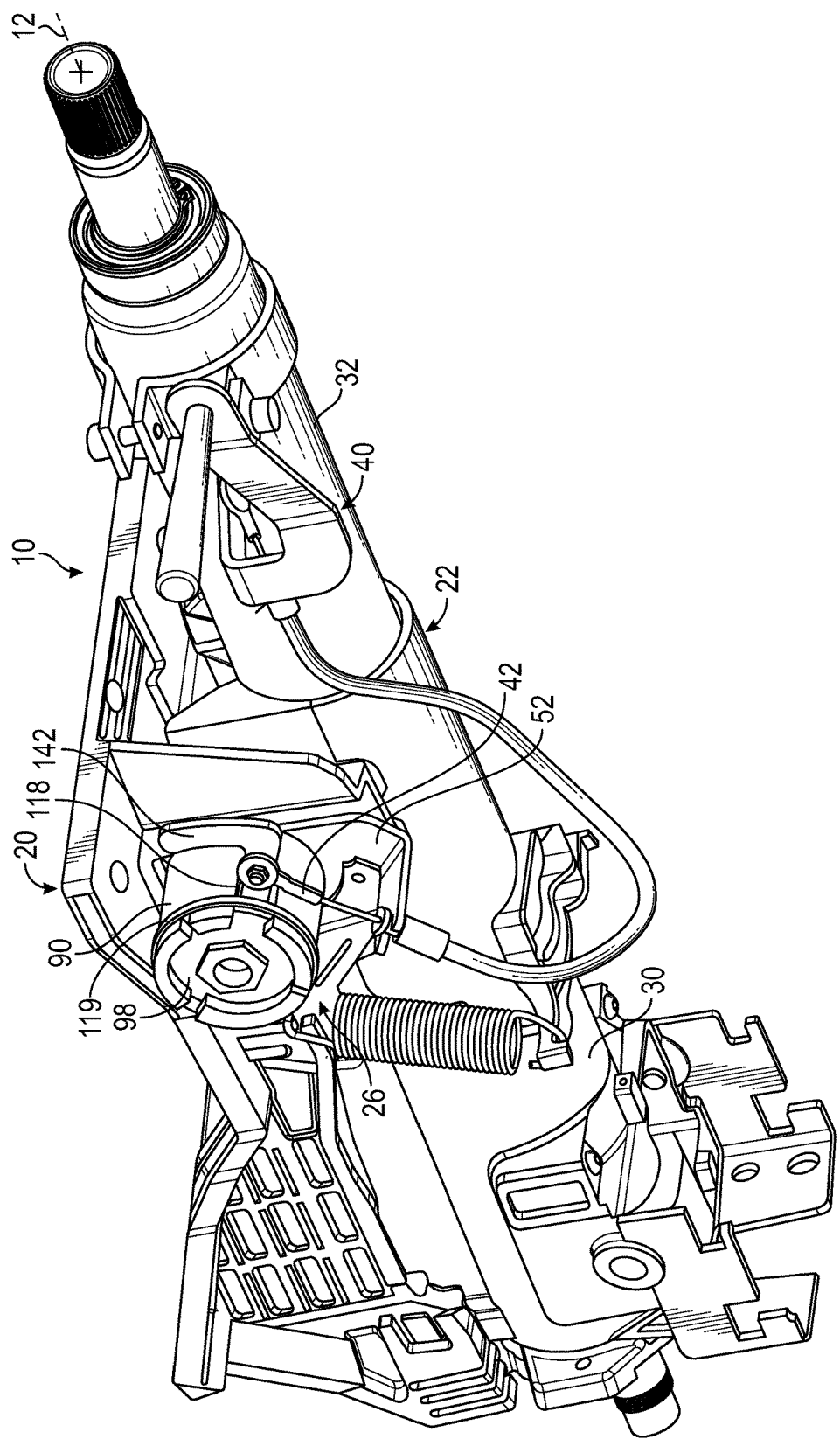
FIG. 1 is a perspective view of a steering column assembly having a locking assembly.

Referring to FIG. 1, a steering column assembly 10 is shown. The steering column assembly 10 extends along a steering column axis 12. The steering column assembly 10 is an adjustable steering column assembly wherein at least a portion of the steering column assembly 10 is movable relative to the steering column axis 12. For example, the steering column assembly 10 translates along the steering column axis 12 and/or tilts, pivots, or rake adjusts relative to a pivot axis that is disposed transverse to the steering column axis 12. The steering column assembly 10 includes a mounting bracket 20, a jacket assembly 22, an energy absorption assembly 24, and a locking assembly 26.

The mounting bracket 20 operatively connects the jacket assembly 22 to a vehicle structure. The mounting bracket 20 is configured to facilitate the adjustment of the pitch, tilt, or rake of the jacket assembly 22.

The jacket assembly 22 is operatively connected to the mounting bracket 20. The jacket assembly 22 is movable relative to the steering column axis 12 and the pivot axis. The jacket assembly 22 includes a lower jacket assembly 30 and an upper jacket assembly 32. The lower jacket assembly 30 is connected to the mounting bracket 20 by a rake bolt 34 that extends through the mounting bracket 20 and the lower jacket assembly 30 but not the upper jacket assembly 32 along a rake bolt axis 36. The rake bolt axis 36 is disposed transverse to the steering column axis 12.

The upper jacket assembly 32 is at least partially received within the lower jacket assembly 30. The upper jacket assembly 32 is translatable along the steering column axis 12 to telescopically adjust a position of a steering wheel coupled to the upper jacket assembly 32.

The combination of the lower jacket assembly 30 and the upper jacket assembly 32 may be pivotable, tiltable, and/or rake adjustable about the pivot axis and/or the rake bolt axis 36 to perform a rake, tilt, or pitch adjustment of the steering wheel coupled to the upper jacket assembly 32. An adjustment assembly 40 may be provided that enables a position of the jacket assembly 22 to be adjusted. The adjustment assembly 40 is movable between a lock position in which the steering wheel coupled to the upper jacket assembly 32 is in a fixed position and an unlock position in which the steering wheel coupled to the upper jacket assembly 32 may be moved between a plurality of positions.

The adjustment assembly 40 includes an actuator 42 that is operatively connected to the locking assembly 26. The actuator 42 may be a straight pull actuator that includes a push pull cable (as shown in FIG. 1), sliding members, or the like that are configured to actuate the locking assembly 26 along an axis that is disposed substantially parallel to the steering column axis 12. The actuator 42 may be a pivoting or otherwise movable actuator that pivots or moves the locking assembly 26 about the rake bolt axis 36 or about an axis disposed substantially perpendicular to the steering column axis 12.

The energy absorption assembly 24 is operatively connected to the mounting bracket 20 and at least one of the lower jacket assembly 30 and the upper jacket assembly 32 of the jacket assembly 22. The energy absorption assembly 24 is configured to restrict adjustment of the jacket assembly 22 relative to the steering column axis 12 and/or the rake bolt axis 36 while the adjustment assembly 40 is in the lock position and is configured to facilitate/permit adjustment of the jacket assembly 22 relative to the steering column axis 12 and or the rake bolt axis 36 while the adjustment assembly 40 is in the unlock position. The energy absorption assembly 24 includes an energy absorption strap 50, a bracket 52, a cam member 54, a pivot pin 56, and a biasing member 58.

The energy absorption strap 50 is disposed on the mounting bracket 20 and extends between the lower jacket assembly 30 and the upper jacket assembly 32. The energy absorption strap 50 is provided with a plurality of engagement members 64. The plurality of engagement members 64 are configured as ridges, teeth, protrusions, or the like.

Figure 2:
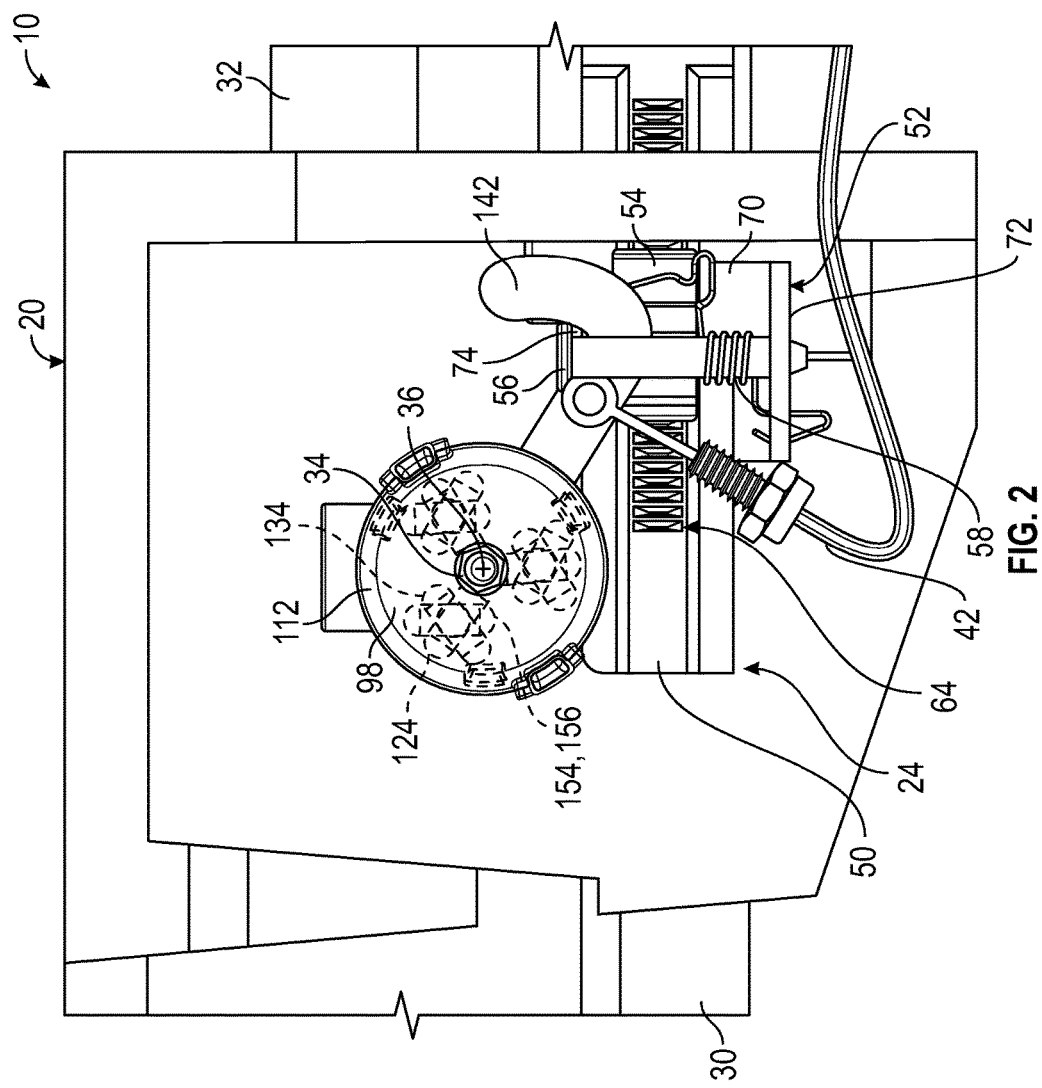
FIG. 2 is a partial elevation view of the steering column assembly having a first embodiment of the locking assembly.

Referring to FIGS. 2 and 5, the bracket 52 is disposed on the mounting bracket 20. The bracket 52 includes a mounting portion 70 having a first wall 72 and a second wall 74. The first wall 72 extends from and is disposed substantially perpendicular to the mounting portion 70. The second wall 74 is spaced apart from and is disposed substantially parallel to the first wall 72. The second wall 74 extends from and is disposed substantially perpendicular to the mounting portion 70. The energy absorption strap 50 is disposed between the first wall 72 and the second wall 74.

The cam member 54 is configured as a locking cam that secures the energy absorption strap 50 to the bracket 52 that is disposed on the mounting bracket 20 when the adjustment assembly 40 is in or is oriented towards the lock position. The cam member 54 is disposed between the first wall 72 and the second wall 74 of the bracket 52. The cam member 54 is spaced apart from and does not engage either of the first wall 72 and the second wall 74. The cam member 54 is pivotally connected to the first wall 72 and the second wall 74 of the bracket 52 by the pivot pin 56. The cam member 54 is configured to pivot about the pivot pin 56.

The cam member 54 includes a plurality of complementary engagement members that are configured to selectively engage the plurality of engagement members 64 of the energy absorption strap 50 based on a position of the adjustment assembly 40. The plurality of complementary engagement members are configured as ridges, teeth, protrusions, or the like. While the adjustment assembly 40 is in the lock position, the plurality of complementary engagement members engage the plurality of engagement members 64. The engagement between the plurality of complementary engagement members and the plurality of engagement members 64 inhibits translation of the energy absorption strap 50. While the adjustment assembly 40 is moving towards or is in the unlock position, the cam member 54 is pivoted or rotated about the pivot pin 56 such that the plurality of complementary engagement members are spaced apart from the plurality of engagement members 64. The spacing apart of the plurality of complementary engagement members from the plurality of engagement members 64 permits translation of the energy absorption strap 50 during an adjustment of the steering column assembly 10.

The pivot pin 56 extends through the first wall 72 and the second wall 74 of the bracket 52 and extends through the cam member 54.

The biasing member 58 is disposed about the pivot pin 56. The biasing member 58 is at least partially disposed between the cam member 54 and the first wall 72 of the bracket 52. The biasing member 58 is operatively connected to the first wall 72 of the bracket 52 and engages the cam member 54. The biasing member 58 biases the plurality of complementary engagement members of the cam member 54 towards engagement with the plurality of engagement members 64 of the energy absorption strap 50.

Figure 3:
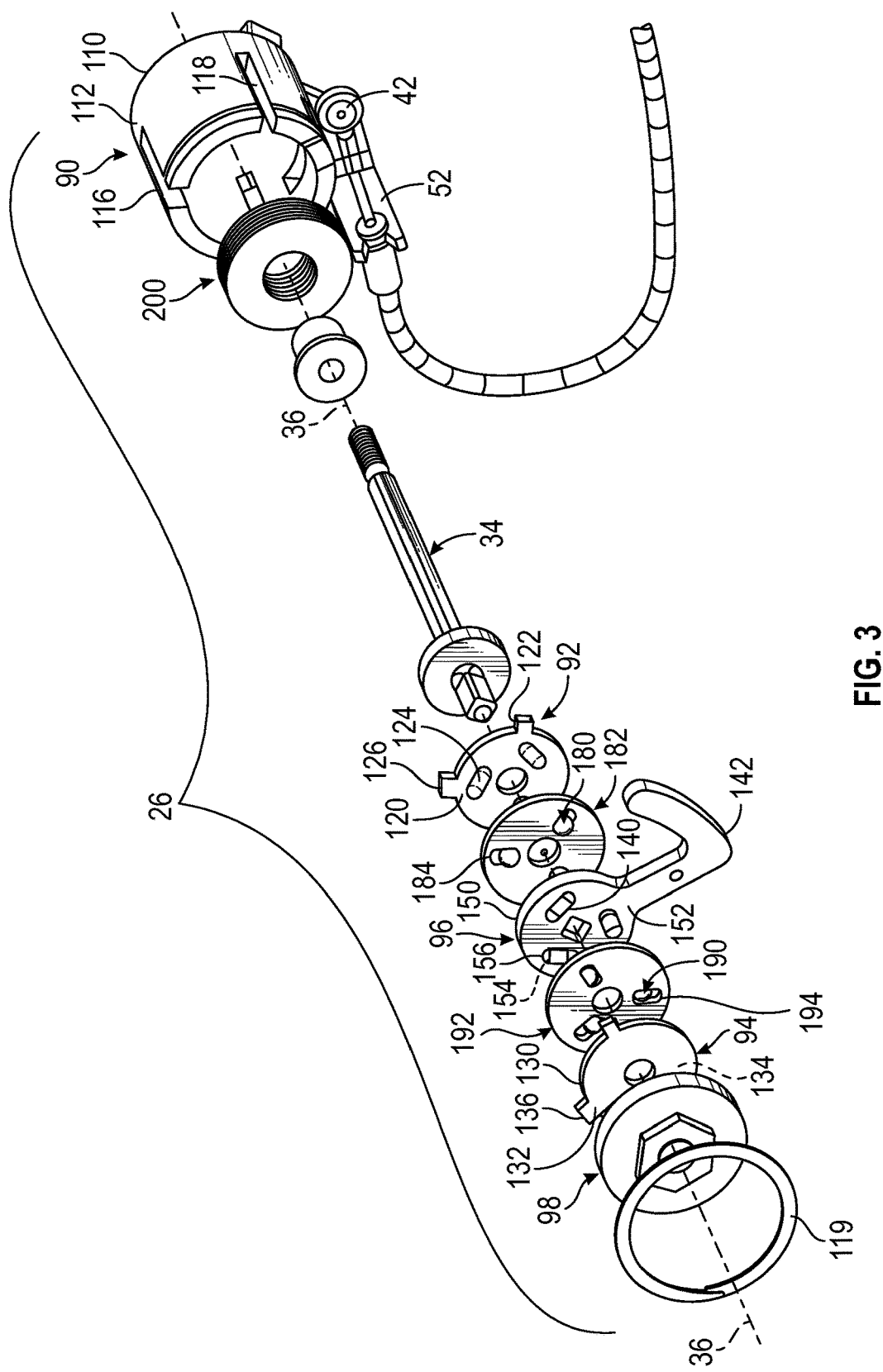
FIG. 3 is a disassembled view of the first embodiment of locking assembly.

Referring to FIGS. 1-3, a first embodiment of the locking assembly 26 is shown. The locking assembly 26 is operatively connected to the bracket 52 that is disposed on the mounting bracket 20, the rake bolt 34, and the jacket assembly 22. The locking assembly 26 is disposed along or substantially parallel to the rake bolt axis 36. The locking assembly 26 includes a housing 90, a first member 92, a second member 94, a third member 96, and a cap 98. The rake bolt 34 extends through the housing 90, the first member 92, the second member 94, the third member 96, and at least partially the cap 98.

The housing 90 includes a base 110 and a wall 112 extending from the base 110. The base 110 may be at least partially disposed on at least one of the mounting portion 70 of the bracket 52 or a mounting bracket 20. The wall 112 extends along the rake bolt axis 36 away from the mounting bracket 20. The base 110 and the wall 112 define a cavity 114. The wall 112 defines a slot 116 that extends from a distal end of the wall 112 towards a proximal end of the wall 112 that is disposed proximate the base 110. In at least one embodiment, the wall 112 defines another slot 118 that is offset or spaced apart from the slot 116. In at least one embodiment, a retainer or a snap-ring 119 is disposed about the distal end of the wall 112 of the housing 90.

The first member 92 is at least partially disposed within the cavity 114 of the housing 90. The first member 92 includes a first member first surface 120 and a first member second surface 122 disposed opposite the first member first surface 120. The first member first surface 120 faces away from the base 110. The first member second surface 122 faces towards and maybe disposed on the base 110.

The first member 92 defines a first member ramp 124 that extends from the first member first surface 120 towards the first member second surface 122.

Referring to FIGS. 3 and 4, the first member 92 may include a first anti-rotation tab 126. The first anti-rotation tab 126 extends radially away from the rake bolt axis 36. The first anti-rotation tab 126 is configured to extend into the slot 116 and is configured to inhibit rotation of the first member 92 about the rake bolt axis 36.

The second member 94 is at least partially disposed within the cavity 114 of the housing 90. The second member 94 is spaced apart from the first member 92. The second member 94 includes a second member first surface 130 and the second member second surface 132 disposed opposite a second member first surface 130. The second member first surface 130 faces towards the first member first surface 120.

The second member 94 defines a second member ramp 134 that extends from the second member first surface 130 towards the second member second surface 132.

The second member 94 may include a second anti-rotation tab 136. The second anti-rotation tab 136 extends radially away from the rake bolt axis 36. The second anti-rotation tab 136 is configured to extend into the slot 116 and is configured to inhibit rotation of the second member 94 about the rake bolt axis 36.

The third member 96 is at least partially disposed between the first member 92 and the second member 94. The third member 96 is configured as an actuating element that moves relative to the stationary or static first and second members 92, 94. The third member 96 includes a body 140 and an actuation arm 142. The body 140 is completely disposed between the first member 92 and the second member 94.

The body 140 includes a first face 150 and a second face 152 disposed opposite the first face 150. The first face 150 faces towards the first member first surface 120. The second face 152 faces towards the second member first surface 130.

The body 140 defines a first body pocket 154 and the second body pocket 156. The first body pocket 154 extends from the first face 150 towards the second face 152. The first body pocket 154 faces towards and is proximately aligned with the first member ramp 124. The second body pocket 156 extends from the second face 152 towards the first face 150. The second body pocket 156 faces towards and is proximately aligned with the second member ramp 134.

The actuation arm 142 extends radially away from the body 140 and the rake bolt axis 36. The actuation arm 142 is disposed substantially parallel to the steering column axis 12. The actuation arm 142 extends through another slot 118 that is offset from the slot 116. As shown in FIGS. 1 and 2, the actuator 42 of the adjustment assembly 40 is operatively connected to the actuation arm 142. The third member 96 is configured to move or pivot relative to the first member 92 or the second member 94 to move the actuation arm 142 to engage the cam member 54 in response to actuation or operation of the actuator 42 of the adjustment assembly 40. The actuation arm 142 engages the cam member 54 while the adjustment assembly 40 is in the unlock position. The actuation arm 142 does not engage the cam member 54 while the adjustment assembly 40 is in the lock position.

Referring to FIG. 4, a partial cross-sectional view of the first member ramp 124 of the first member 92 and the second member ramp 134 of the second member 94 is shown. Each of the first member ramp 124 and the second member ramp 134 defines a lock portion 160, a release portion 162, and a ramp portion 164 extending between the lock portion 160 and the release portion 162. The release portion 162 of the first member ramp 124 is proximately aligned with the first body pocket 154; likewise the second member ramp 134 is proximately aligned with the second body pocket 156. Additionally, respective release portions are aligned along an axis that is disposed substantially parallel to the rake bolt axis 36. The lock portion 160 and the ramp portion 164 of the first member ramp 124 is radially offset from the lock portion 160 and the ramp portion 164 of the first body pocket 154 such that the first member ramp 124 is cross-angled with respect to the first body pocket 154.

The first member 92 and the second member 94 may each be provided with a plurality of ramps. As shown in the figures, the first member 92 and the second member 94 are illustrated with three ramps; however other numbers of paired ramps are also contemplated.

The lock portion 160 has a lock portion height 170 measured from one of the first member first surface 120 and the second member first surface 130 towards a point disposed between the first member first surface 120 and the first member second surface 122 or the second member first surface 130 and the second member second surface 132. The release portion 162 has a release portion height 172 measured from one of the first member first surface 120 and the second member first surface 130 towards a point disposed between the first member first surface 120 and the first member second surface 122 or the second member first surface 130 and the second member second surface 132. The release portion height 172 is greater than the lock portion height 170.

The ramp portion 164 has a ramp portion angle 174. The ramp portion angle 174 is configured as a lift angle that provides a mechanical advantage to aid in locking and unlocking the locking assembly 26 to inhibit or facilitate adjustment of the jacket assembly 22.

A first rolling element 180 is disposed between the first member 92 and the third member 96. The first rolling element 180 is at least partially received within the first member ramp 124 and/or the first body pocket 154. The first rolling element 180 may be a ball bearing, roller bearing, or the like. As shown in FIG. 3, a plurality of first rolling elements may be provided. In at least one embodiment, a first cage 182 is disposed between the first member 92 and the third member 96. The first cage 182 is provided with at least one opening 184 that is configured to at least partially receive the first rolling element 180. The first cage 182 is configured to aid in the installation of the first rolling element 180 within the locking assembly 26.

A second rolling element 190 is disposed between the second member 94 and the third member 96. The second rolling element 190 is at least partially received within the second member ramp 134 and/or the second body pocket 156. The second rolling element 190 may be a ball bearing, roller bearing, or the like. As shown in FIG. 3, a plurality of second rolling elements may be provided. In at least one embodiment, a second cage 192 is disposed between the second member 94 and the third member 96. The second cage 192 is provided with at least one opening 194 that is configured to at least partially receive the second rolling element 190. The second cage 192 is configured to aid in the installation of the second rolling element 190 within the locking assembly 26.

The first rolling element 180 is received within the lock portion 160 while the adjustment assembly 40 is in the lock position and the actuation arm 142 is spaced apart from the cam member 54. The first rolling element 180 is received within the release portion 162 while the adjustment assembly 40 is in the unlock position and the actuation arm 142 engages the cam member 54. The second rolling element 190 is received within the lock portion 160 while the adjustment assembly 40 is in the lock position and the actuation arm 142 is spaced apart from the cam member 54. The second rolling element 190 is received within the release portion 162 while the adjustment assembly 40 is in the unlock position and the actuation arm 142 engages the cam member 54.

The receiving of the first rolling element 180 in the lock portion 160 of the first member 92 and the receiving of the second rolling element 190 in the lock portion 160 of the second member 92 causes a biasing member 200 that is disposed about the rake bolt 34 to create energy that clamps the system or aids in the application of a clamp force to clamp the steering column assembly 10 together by expanding to inhibit adjustment of the jacket assembly 22. The receiving of the first rolling element 180 in the release portion 162 of the first member 92 and the receiving of the second rolling element 190 in the release portion 162 of the second member 94, the biasing member 200 compresses and aids in releasing a clamp force to facilitate adjustment of the jacket assembly 22. The biasing member 200 is received within the housing 90 and is disposed between the first member second surface 122 and the base 110 of the housing 90. The biasing member 200 may be a Belleville spring/washer, a helical spring, stack of disk springs, or the like.

The cap 98 is disposed proximate the distal end of the housing 90. The cap 98 is at least partially received within the cavity 114. In such an embodiment, an axially operating compression spring is applied along with the snap ring 119. The cap 98 is configured to at least partially retain the first member 92, the second member 94, and the third member 96 within the cavity 114.

Figure 6:
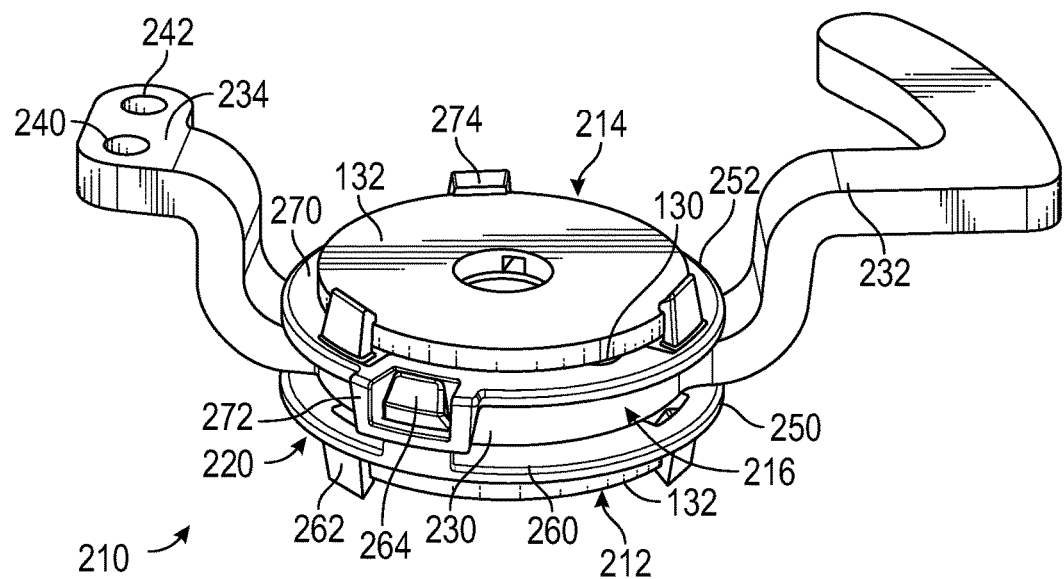
FIG. 6 is a perspective view of a portion of the second embodiment of the locking assembly.
Figure 7:
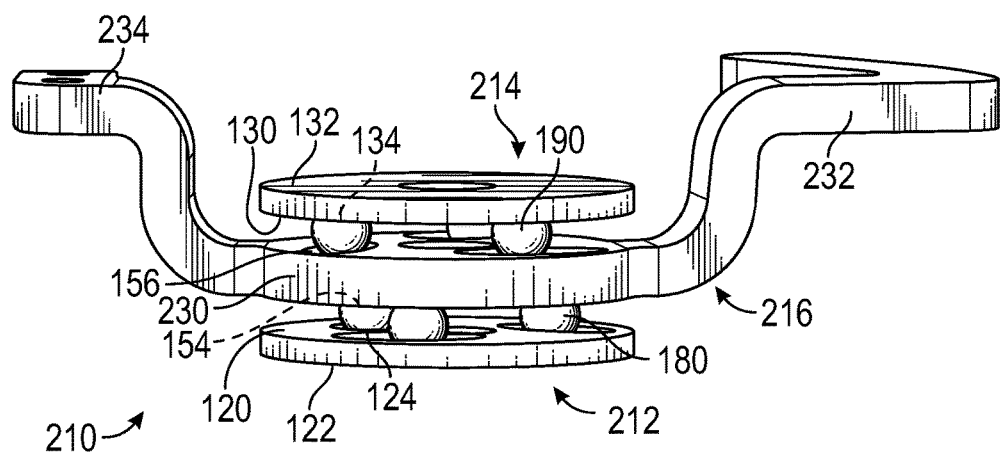
FIG. 7 is a perspective view of a portion of the second embodiment of the locking assembly with a retainer assembly removed for clarity.

Referring to FIGS. 5-7, a second embodiment of a locking assembly 210 is shown. The locking assembly 210 is operatively connected to the mounting bracket 20 and/or the jacket assembly 22. The locking assembly 210 includes a first member 212, a second member 214, a third member 216, a biasing member 218, and a retainer assembly 220.

The first member 212 has a substantially similar configuration as the first member 92. The first member 212 includes an anti-rotation feature formed on a thru hole that extends through the first member 212. The anti-rotation feature is configured to interact with a flat section of the rake bolt 34 to inhibit rotation of the first member 212. The first member 212 includes the first member ramp 124.

The second member 214 is spaced apart from the first member 212. The second member 214 has substantially similar configuration as the second member 94. The second member 214 includes an anti-rotation feature formed on a thru-hole that extends through the second member 214. The anti-rotation feature is configured to interact with the flat section of the rake bolt 34 to inhibit rotation of the second member 214. The second member 214 includes the second member ramp 134.

The third member 216 is disposed between the first member 212 and the second member 214. The third member 216 includes a body 230, a first arm 232, and a second arm 234.

The body 230 has a substantially similar configuration as the body 140 and includes a first body pocket 154 and the second body pocket 156. The first rolling element 180 is at least partially received within the first body pocket 154 and the first member ramp 124. The second rolling element 190 is at least partially received within the second body pocket 156 and the second member ramp 134.

The first arm 232 extends radially away from the rake bolt axis 36 and extends towards the energy absorption assembly 24. The first arm 232 is configured to selectively engage the cam member 54.

The second arm 234 is radially spaced apart from the first arm 232. The second arm 234 extends radially away from the rake bolt axis 36. The second arm 234 defines a first arm opening 240 and a second arm opening 242 spaced apart from the first arm opening 240. The first arm opening 240 and the second arm opening 242 extend along an axis that is disposed substantially parallel to the rake bolt axis 36 and is disposed substantially perpendicular to the steering column axis 12.

The first arm opening 240 is configured to receive at least a portion of the actuator 42 of the adjustment assembly 40. The actuator 42 of the adjustment assembly 40 is configured to move the second arm 234 and the third member 216 relative to at least one of the first member 212 and the second member 214 in a first direction.

The second arm opening 242 is configured to receive at least a portion of the biasing member 218. The biasing member 218 extends between the second arm 234 and a portion of the bracket 52. The biasing member 218 is configured to move the second arm 234 and the third member 216 relative to at least one of the first member 212 and the second member 214 in a second direction that is disposed opposite the first direction.

Referring to FIGS. 5 and 6, the retainer assembly 220 may be a snap fit rolling element and race retainer. The retainer assembly 220 is configured to retain the first rolling element and 180 and the second rolling element 190 between the first member 212 and the third member 216 and the second member 214 and the third member 216, respectively. The retainer assembly 220 is disposed about the first member 212, the second member 214, and the third member 216. The retainer assembly 220 is operatively connected to the first member 212 and the second member 214. The retainer assembly 220 includes a first retainer 250 and a second retainer 252.

The first retainer 250 includes a first retaining ring 260, a first retaining snap 262, and a second retaining snap 264. The first retaining ring 260 is at least partially disposed on the first member first surface 120. The first retaining ring 260 is disposed at least partially around a periphery of the first member 212. The first retaining snap 262 extends from the first retaining ring 260 towards the first member second surface 122. The first retaining snap 262 includes a lip, barb, or the like that extends at least partially over a portion of the first member second surface 122. The second retaining snap 264 extends from the first retaining ring 260 towards the second member 214. The second retaining snap 264 may be radially spaced apart from or radially offset from the first retaining snap 262. The second retaining snap 264 extends at least partially over a portion of the third member 216.

The second retainer 252 includes a second retaining ring 270, a snap receiver 272, and a third retaining snap 274. The second retaining ring 270 is at least partially disposed on the second member first surface 130. The second retaining ring 270 is disposed at least partially around a periphery of the second member 214. The snap receiver 272 extends from the second retaining ring 270 towards the first member 212. The snap receiver 272 at least partially overlaps the third member 216. The snap receiver 272 is configured to receive the second retaining snap 264 to secure the first retainer 250 to the second retainer 252. The third retaining snap 274 extends from the second retaining ring 270 towards the second member second surface 132. The third retaining snap 274 may be radially spaced apart from or radially offset from the snap receiver 272. The third retaining snap 274 includes a lip, barb, or the like that extends at least partially over a portion of the second member second surface 132.

Throughout this specification, the term "attach," "attachment," "connected," "coupled," "coupling," "mount," or "mounting" shall be interpreted to mean that a structural component or element is in some manner connected to or contacts another element, either directly or indirectly through at least one intervening structural element, or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly, comprising:
   a jacket assembly that is configured to be adjustable along a steering column axis, and
   a locking assembly pivotally connected to the jacket assembly, the locking assembly comprising:
      a first member having a first member first surface, a first member second surface disposed opposite the first member first surface, and a first member ramp that extends from the first member first surface towards the first member second surface,
      a second member spaced apart from the first member, the second member having a second member first surface that faces towards the first member first surface, a second member second surface disposed opposite the second member first surface, and a second member ramp that extends from the second member first surface towards the second member second surface, and
      a third member being movable relative to at least one of the first member and the second member, the third member having a body disposed between the first member and the second member, the body of the third member has a first face that faces towards the first member first surface, a second face that faces towards the second member first surface, and a first arm that extends towards an energy absorption assembly.

2. The steering column assembly of claim 1, wherein the first arm is operatively connected to an actuator that is configured to move the first arm and the third member relative to at least one of the first member and the second member.

3. The steering column assembly of claim 1, wherein the body of the third member defines a first body pocket that extends from the first face towards the second face.

4. The steering column assembly of claim 3, wherein the body of the third member defines a second body pocket that extends from the second face towards the first face.

5. The steering column assembly of claim 4, wherein the locking assembly further comprising:
   a first rolling element at least partially received within the first body pocket and the first member ramp.

6. The steering column assembly of claim 5, wherein the locking assembly further comprising:
   a second rolling element at least partially received within the second body pocket and the second member ramp.

7. The steering column assembly of claim 6, wherein the third member further comprising a second arm extending from the body.

8. The steering column assembly of claim 7, wherein the second arm is operatively connected to an actuator that is configured to move the second arm and the third member relative to at least one of the first member and the second member.

9. The steering column assembly of claim 8, wherein the locking assembly further comprising a biasing member operatively connected to the second arm and a bracket disposed on the jacket assembly, the biasing member configured to move the second arm and the third member relative to at least one of the first member and the second member.

10. The steering column assembly of claim 5, further comprising a retainer assembly disposed about and operatively connected to the first member and the second member.

11. A steering column assembly, comprising:
   a locking assembly operatively connected to a jacket assembly that extends along a steering column axis, the locking assembly comprising:
      a housing having a base and a wall extending from the base, the wall defining a slot that extends transverse to the steering column axis, the wall and the base defining a cavity,
      a first member disposed within the cavity, the first member defining a first member ramp and a first anti-rotation tab that is configured to extend into the slot,
      a second member disposed within the cavity and spaced apart from the first member, the second member defining a second member ramp and a second anti-rotation tab that is configured to extend into the slot
      a third member having a body disposed between the first member and the second member and an actuation arm extending from the body, the actuation arm extends through the slot, and
      a biasing member; and
   a rake bolt extending at least partially through the jacket assembly, the housing, the first member, the second member, and the third member, the biasing member being disposed about the rake bolt.

12. The steering column assembly of claim 11, wherein the body defines a first body pocket that faces towards the first member ramp and a second body pocket disposed opposite the first body pocket and faces towards the second member ramp.

13. The steering column assembly of claim 12, wherein the locking assembly further comprising:
   a first rolling element at least partially received within the first body pocket and the first member ramp; and
   a second rolling element at least partially received within the second body pocket and the second member ramp.

14. The steering column assembly of claim 13, wherein in response to actuation of an actuator operatively connected to the actuation arm, the third member pivots about the rake bolt relative to the first member and the second member.

15. A steering column assembly, comprising:
   a locking assembly operatively connected to a jacket assembly, the locking assembly comprising:
      a housing having a base and a wall defining a slot, the wall and the base defining a cavity,
      a first member disposed within the cavity, the first member defining a first member ramp and a first anti-rotation tab that extends into the slot,
      a second member disposed within the cavity and spaced apart from the first member, the second member defining a second member ramp, and
      a third member having a body disposed between the first member and the second member.

16. The steering column assembly of claim 15, wherein the third member has an actuation arm that extends from the body and through the slot.

17. The steering column assembly of claim 15, wherein the second member defines a second anti-rotation tab that extend into the slot.

18. The steering column assembly of claim 15, further comprising:
- a rake bolt that extends at least partially through the jacket assembly, the housing, the first member, the second member, and the third member.

19. The steering column assembly of claim 18, further comprising:
- a biasing member disposed about the rake bolt.

* * * * *